(12) United States Patent
Feng et al.

(10) Patent No.: US 11,046,013 B1
(45) Date of Patent: Jun. 29, 2021

(54) EXTRUDER CALIBRATION METHOD FOR DUAL-EXTRUDER 3D PRINTER AND SYSTEM THEREOF

(71) Applicant: Shanghai Fusion Tech Co Ltd, Shanghai (CN)

(72) Inventors: Hua Feng, Shanghai (CN); Jianzhe Li, Shanghai (CN); Jinjing Zhang, Shanghai (CN); Xi Cao, Shanghai (CN); Xiaoyu Wu, Shanghai (CN); Zhongwei Yu, Shanghai (CN); Wangping Long, Shanghai (CN)

(73) Assignee: Shanghai Fusion Tech Co., Ltd., Shanghai (CN)

( * ) Notice: Subject to any disclaimer, the term of this patent is extended or adjusted under 35 U.S.C. 154(b) by 0 days.

(21) Appl. No.: 16/888,772

(22) Filed: May 31, 2020

(30) Foreign Application Priority Data

Feb. 28, 2020 (CN) .......................... 202010127262.X

(51) Int. Cl.
| | | |
|---|---|---|
| *B29C 64/393* | (2017.01) | |
| *B29C 64/245* | (2017.01) | |
| *B29C 64/236* | (2017.01) | |
| *B29C 64/205* | (2017.01) | |
| *B29C 64/232* | (2017.01) | |
| *B33Y 50/02* | (2015.01) | |

(Continued)

(52) U.S. Cl.
CPC .......... *B29C 64/393* (2017.08); *B29C 64/205* (2017.08); *B29C 64/232* (2017.08); *B29C 64/236* (2017.08); *B29C 64/245* (2017.08); *B29C 64/209* (2017.08); *B33Y 10/00* (2014.12); *B33Y 30/00* (2014.12); *B33Y 50/02* (2014.12)

(58) Field of Classification Search
CPC ... B29C 64/393; B29C 64/232; B29C 64/245; B29C 64/236; B29C 64/205; B29C 64/209; B33Y 10/00; B33Y 30/00; B33Y 50/02
USPC .......................................... 264/40.1; 425/375
See application file for complete search history.

(56) References Cited

U.S. PATENT DOCUMENTS

| | | | |
|---|---|---|---|
| 2017/0057171 A1 | 3/2017 | Chang et al. | |
| 2017/0144379 A1 | 5/2017 | Sung et al. | |
| 2020/0269506 A1* | 8/2020 | MacMullen | .......... B29C 64/393 |

FOREIGN PATENT DOCUMENTS

| | | |
|---|---|---|
| CN | 103552243 A | 2/2014 |
| CN | 203792721 U | 8/2014 |

(Continued)

OTHER PUBLICATIONS

Anycubic kossel 3D printer automatic leveling tutorial, mz6 Net, published on May 27, 2019.

*Primary Examiner* — Joseph S Del Sole
*Assistant Examiner* — Lawrence D. Hohenbrink, Jr.
(74) *Attorney, Agent, or Firm* — Avant Law Group, LLC

(57) ABSTRACT

Extruder calibration methods and systems for a dual-extruder 3D printer are disclosed. In an embodiment, an extruder calibration method for a dual-extruder 3D printer having a left extruder and a right extruder includes the following steps: (1) building up a rectangular coordinate system on a heat bed of a 3D printer; (2) obtaining a first offset by calculating an offset between the left extruder and the right extruder in an X-axis direction; (3) obtaining a second offset by calculating an offset between the left extruder and the right extruder in a Y-axis direction; and (4) calibrating the left extruder and the right extruder according to the first offset and the second offset.

10 Claims, 3 Drawing Sheets

(51) Int. Cl.
*B33Y 10/00* (2015.01)
*B33Y 30/00* (2015.01)
*B29C 64/209* (2017.01)

(56) References Cited

FOREIGN PATENT DOCUMENTS

| | | |
|---|---|---|
| CN | 104786505 A | 7/2015 |
| CN | 103148761 B | 8/2015 |
| CN | 205674487 U | 11/2016 |
| CN | 108656550 A | 10/2018 |
| CN | 110667116 A | 1/2020 |
| KR | 102031070 B1 | 10/2019 |

* cited by examiner

EXTRUDER CALIBRATION METHOD FOR DUAL-EXTRUDER 3D PRINTER AND SYSTEM THEREOF

CROSS REFERENCE TO RELATED APPLICATIONS

This application claims priority to Chinese application number 202010127262.X filed on Feb. 28, 2020, the disclosure of which is incorporated by reference herein in its entirety.

FIELD OF THE DISCLOSURE

The disclosure relates generally to 3D printing technologies. More specifically, the disclosure relates to extruder calibration methods for dual-extruder 3D printers and systems thereof.

BACKGROUND 3D printing, also known as additive manufacturing, is a rapid prototyping technique. 3D printing is the process of heating a hot-melt filament, extruding a stream of the material using an extruder, and depositing the layer on a printing platform or on a cured layer of the material. When the temperature is lower than the curing temperature of the material, curing and solidifying begin, and the material is then transformed into a three-dimensional object. This technique is widely used in various industries such as art, creative, education, jewelry, and healthcare.

In a practical printing process, the user needs to adjust the extruder to an appropriate height according to the best line printed. But the selection of the best line is subject to subjective factors and less-than-accurate height adjustment, resulting in repeated cycles of adjusting, printing, and readjusting, which are tedious, time-consuming, and energy-consuming.

In addition, the current predominant dual-extruder 3D printers on the market have the problem of dual extruder offset in the horizontal plane.

SUMMARY

The following presents a simplified summary of the invention to provide a basic understanding of some aspects of the invention. This summary is not an extensive overview of the invention. It is not intended to identify critical elements or to delineate the scope of the invention. Its sole purpose is to present some concepts of the invention in a simplified form as a prelude to the more detailed description that is presented elsewhere.

In some embodiments, the disclosure provides an extruder calibration method for a dual-extruder 3D printer having a left extruder and a right extruder. The extruder calibration method includes the following steps. (1) Building up a rectangular coordinate system on a heat bed of a 3D printer. (2) Obtaining a first offset by calculating an offset between the left extruder and the right extruder in an X-axis direction. (3) Obtaining a second offset by calculating an offset between the left extruder and the right extruder in a Y-axis direction. (4) Calibrating the left extruder and the right extruder according to the first offset and the second offset.

Optionally, step (2) further includes the following steps. (2.1) Adjusting a position of the left extruder and a position of the right extruder so that the left extruder and the right extruder are both on a Y-axis. (2.2) Setting an X-axis print interval and an X-axis interval step. (2.3) Controlling the left extruder to print a first line parallel to a Y-axis on the Y-axis. (2.4) Controlling the right extruder to print a second line parallel to the Y-axis on the Y-axis. (2.5) Controlling the left extruder to sequentially print N first equally spaced interval lines parallel to the Y-axis in positive and negative directions of the X-axis respectively, where N≥1 and a distance between a first one of the N first interval lines and the first line is the X-axis print interval. (2.6) Controlling the right extruder to sequentially print N second interval lines parallel to the Y-axis in the positive and negative directions of the X-axis respectively, where a distance between a first one of the N second interval lines and the second line is $X_0$, the distance between an $n^{th}$ second interval line and an $(n-1)^{th}$ second interval line in the positive and negative directions of the X-axis is $X_0+A(n-1)$, where $X_0$ is the X-axis print interval, A is the X-axis interval step, and n is a line number of the $n^{th}$ second interval line printed by the right extruder, the line number of the second line is 0, line numbers increase in the positive and negative directions of the X-axis, and n=2, 3, . . . , N. (2.7) Determining whether there are lines coinciding between the lines printed by the left extruder and the right extruder in step (2.6). If not, (2.7a) adjusting the X-axis interval step and controlling the right extruder to again sequentially print N second interval lines parallel to the Y-axis in the positive and negative directions of the X-axis respectively and returning to step (2.7); if so, (2.7b) proceeding to step (2.8). (2.8) Calculating the offset between the left extruder and the right extruder in the X-axis direction according to a line number of the lines that coincide, the offset between the left extruder and the right extruder in the X-axis direction being the first offset.

Optionally, step (2.8) further includes determining whether the X-axis coordinate of the lines that coincide is greater than 0. If so, (2.8a) calculating the first offset according to B=AN'; if not, (2.8b) calculating the first offset according to B=−AN', where B is the first offset, and N' is the line number of the lines that completely coincide.

Optionally, step (3) further includes the following steps. (3.1) Adjusting the positions of the left extruder and the right extruder so that the left extruder and the right extruder are both on the X-axis. (3.2) Setting a Y-axis print interval and a Y-axis interval step. (3.3) Controlling the left extruder to print a third line parallel to the X-axis on the X-axis. (3.4) Controlling the right extruder to print a fourth line parallel to the X-axis on the X-axis. (3.5) Controlling the left extruder to sequentially print M third equally spaced interval lines parallel to the X-axis in positive and negative directions of the Y-axis respectively, where M≥1 and a distance between a first one of the M third interval lines and the third line is the Y-axis print interval. (3.6) Controlling the right extruder to sequentially print M fourth interval lines parallel to the X-axis in the positive and negative directions of the Y-axis respectively, where a distance between a first one of the M fourth interval lines and the fourth line is $X_1$, a distance between an $m^{th}$ fourth interval line and an $(m-1)^{th}$ fourth interval line in the positive and negative directions of the Y-axis is $X_1+A_1(m-1)$, where $X_1$ is the Y-axis print interval, $A_1$ is the Y-axis interval step, m is a line number of the $m^{th}$ fourth interval line printed by the right extruder, the line number of the fourth line is 0, line numbers increase in the positive and negative directions of the Y-axis, m=2, 3, . . . , M. (3.7) Determining whether there are lines coinciding between the lines printed by the left extruder and the right extruder in step (3.6). If not, (3.7a) adjusting the Y-axis interval step, controlling the right extruder to again sequentially print M fourth interval lines parallel to the X-axis in the positive and negative directions of the Y-axis respectively, and returning to step (3.7); if so, (3.7b) proceeding to step (3.8). (3.8) Calculating the offset between the left extruder and the right extruder in the Y-axis direction according to the line number of the lines that coincide, the offset between the left extruder and the right extruder in the Y-axis direction being the second offset.

Optionally, step (3.8) further includes determining whether the Y-axis coordinate of the lines that coincide is greater than 0. If so, (3.8a) calculating the second offset according to $C=A_1M'$; if not, (3.8b) calculating the second offset according to $C=-A_1M'$, where is the second offset, is the line number of the lines that completely coincide.

Optionally, the extruder calibration method further includes a step (5) of a vertical calibration of the left extruder and the right extruder. The step (5) further includes the following steps. (5.1) Obtaining a first height difference by calculating a height difference between the left extruder and a bottom of a probe. (5.2) Adjusting a height of the left extruder according to the first height difference. (5.3) Obtaining a second height difference by calculating a height difference between the right extruder and the bottom of the probe. (5.4) Adjusting a height of the right extruder according to the second height difference.

Optionally, step (5.1) further includes the following steps. (5.1.1) Determining an initial height of the left extruder from the bottom of the probe when the probe is triggered. (5.1.2) Obtaining a printing height of a first line for the left extruder and printing the first line of the left extruder by adjusting the height of the left extruder vertically based on the initial height of the left extruder from the bottom of the probe. (5.1.3) Determining whether the first line of the left extruder is a fully wavy line. (5.1.3a) If so, decreasing the printing height of the first line of the left extruder and reprinting the first line of the left extruder, and returning to step (5.1.3), and (5.1.3b) if not, proceeding to step (5.1.4). (5.1.4) Adjusting the height of the left extruder according to a predetermined step for t times, and printing lines of corresponding heights. (5.1.5) Determining whether there is a fully wavy line among the lines of the corresponding heights. If not, (5.1.5a) increasing the printing height of the first line of the left extruder and reprinting the first line of the left extruder and returning to step (5.1.5); if so, (5.1.5b) obtaining the height corresponding to a first fully wavy line of the left extruder and calculating the height difference between the left extruder and the bottom of the probe, the height difference between the left extruder and the bottom of the probe being the first height difference.

Optionally, the calculating the height difference between the left extruder and the bottom of the probe is according to the following equation.

$$Offset_1 = Offset0_1 - Zstart_1 - (Zstep \times Index_1) + Z0 + Z1_1$$

Here, $Offset_1$ is the first height difference, $Offset0_1$ is the initial height of the left extruder from the bottom of the probe, $Zstart_1$ is the printing height of the first line of the left extruder, $Zstep$ is the predetermined step, $Index_1$ is a line number of the first fully wavy line of the left extruder minus 1, $Z0$ is the height from a printing platform for printing the best line, and $Z1_1$ is the height difference between the first fully wavy line of the left extruder and the height for printing the best line.

In other embodiments, the disclosure provides an extruder calibration system for a dual-extruder 3D printer including a horizontal calibration unit. The dual-extruder includes a left extruder and a right extruder. The horizontal calibration unit includes a building module configured to build up a rectangular coordinate system on a heat bed of a 3D printer; a first calculation module connected to the building module, the left extruder, and the right extruder respectively, and configured to obtain a first offset by calculating an offset between the left extruder and the right extruder in an X-axis direction; a second calculation module connected to the building module, the left extruder, and the right extruder respectively, and configured to obtain a second offset by calculating an offset between the left extruder and the right extruder in a Y-axis direction; and a horizontal calibration module connected to the first calculation module, the second calculation module, the left extruder, and the right extruder respectively, and configured to calibrate the left extruder and the right extruder according to the first offset and the second offset.

Optionally, the extruder calibration further includes a vertical calibration unit. The vertical calibration unit is connected to the left extruder and the right extruder respectively. The vertical calibration unit is configured to calibrate the left extruder and the right extruder vertically.

BRIEF DESCRIPTION OF THE DRAWINGS

Illustrative embodiments of the disclosure are described in detail below with reference to the figures.

DETAILED DESCRIPTION

The following describes some non-limiting embodiments of the invention with reference to the accompanying drawings. The described embodiments are merely a part rather than all of the embodiments of the invention. All other embodiments obtained by a person of ordinary skill in the art based on the embodiments of the disclosure shall fall within the scope of the disclosure.

Figure 1:
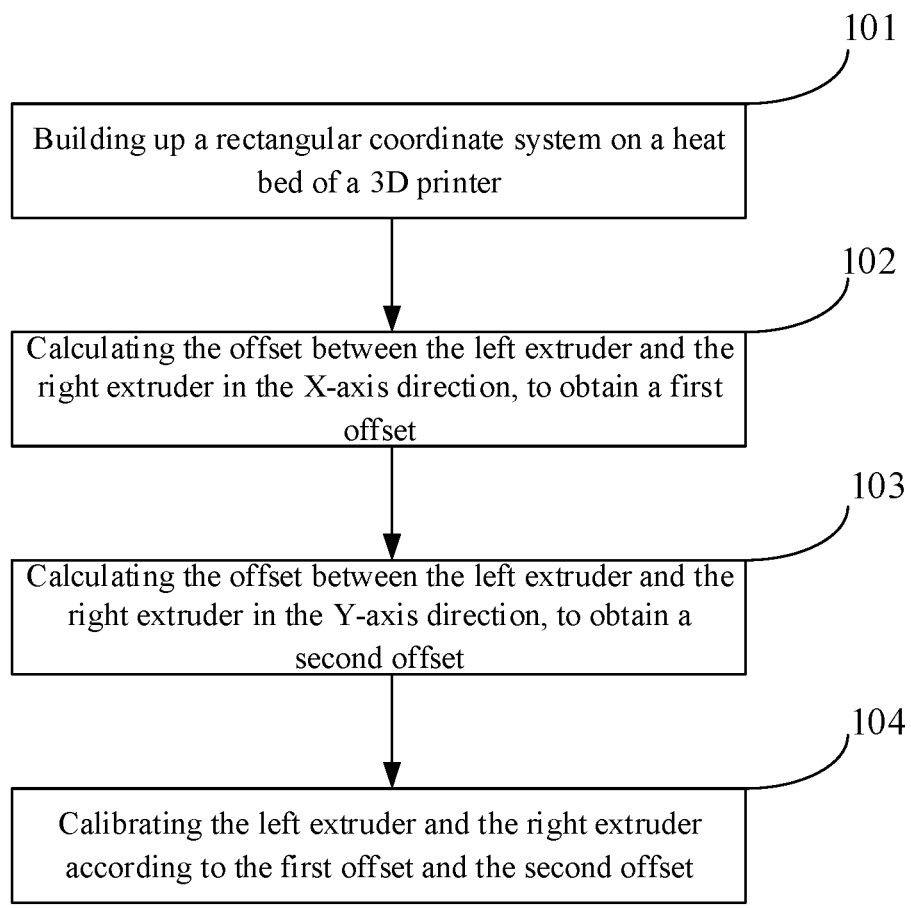
FIG. 1 is a flow chart illustrating an extruder calibration method for a dual-extruder 3D printer according to an embodiment of the disclosure.

FIG. 1 is a flow chart illustrating an extruder calibration method for a dual-extruder 3D printer according to an embodiment of the disclosure. As shown in FIG. 1, the extruder calibration method for a dual-extruder 3D printer may include horizontal calibration of a left extruder and a right extruder. The horizontal calibration of a left extruder and a right extruder may include the following steps. Step 101. Building up a rectangular coordinate system on a heat bed of a 3D printer. Step 102. Calculating the offset between the left extruder and the right extruder in the X-axis direction to obtain a first offset. Step 103. Calculating the offset between the left extruder and the right extruder in the Y-axis direction to obtain a second offset. Step 104. Calibrating the left extruder and the right extruder according to the first offset and the second offset.

Step 102 may further include the following steps.

Step 1021. Adjusting the positions of the left extruder and the right extruder so that the left extruder and the right extruder are both on the Y-axis.

Step 1022. Setting an X-axis print interval and an X-axis interval step.

Step 1023. Controlling the left extruder to print a first line parallel to the Y-axis on the Y-axis.

Step 1024. Controlling the right extruder to print a second line parallel to the Y-axis on the Y-axis.

Step 1025. Controlling the left extruder to sequentially print N first equally spaced interval lines parallel to the Y-axis in the positive and negative directions of the X-axis respectively, where N≥1, and the distance between the first one of the first interval lines and the first line may be the X-axis print interval.

Step 1026. Controlling the right extruder to sequentially print N second interval lines parallel to the Y-axis in the positive and negative directions of the X-axis respectively, where the distance between the first one of the second interval lines and the second line is $X_0$. The distance between the $n^{th}$ second interval line and the $(n-1)^{th}$ second interval line in the positive and negative directions of the X-axis is $X_0+A(n-1)$. Here, $X_0$ is the X-axis print interval, A is the X-axis interval step, n is the line number of the $n^{th}$ second interval line printed by the right extruder, the line number of the second line is 0, the line numbers increase in the positive and negative directions of the X-axis, and n=2, 3, . . . , N.

Step 1027. Determining whether there are lines coinciding between the lines printed by the left extruder and the right extruder. If not, (1027a) adjusting the X-axis interval step and controlling the right extruder to again sequentially print N second interval lines parallel to the Y-axis in the positive and negative directions of the X-axis respectively, and returning to step 1027; if so, (1027b) proceeding to step 1028.

Step 1028. Calculating the offset between the left extruder and the right extruder in the X-axis direction according to the line number of the lines that coincide. The offset between the left extruder and the right extruder in the X-axis direction may be the first offset.

Step 1028 may further include the following steps.

Step 10281. Determining whether the X-axis coordinate of the lines that coincide is greater than 0. The X-axis coordinate of the lines that coincide being greater than 0 indicates that the lines that coincide is in the positive half of the X-axis, and the X-axis coordinate of the lines that coincide being less than 0 indicates that the lines that coincide is in the negative half of the X-axis. Step 10282. If so, calculating the first offset according to the equation $B=AN'$. Step 10283. If not, calculating the first offset according to the equation $B=-AN'$. Here, B is the first offset, and N' is the line number of the lines that completely coincide.

Step 103 may further include the following steps.

Step 1031. Adjusting the positions of the left extruder and the right extruder so that the left extruder and the right extruder are both on the X-axis.

Step 1032. Setting a Y-axis print interval and a Y-axis interval step.

Step 1033. Controlling the left extruder to print a third line parallel to the X-axis on the X-axis.

Step 1034. Controlling the right extruder to print a fourth line parallel to the X-axis on the X-axis.

Step 1035. Controlling the left extruder to sequentially print M third equally spaced interval lines parallel to the X-axis in the positive and negative directions of the Y-axis respectively, where M≥1 and the distance between the first one of the third interval lines and the third line may be the Y-axis print interval.

Step 1036. Controlling the right extruder to sequentially print M fourth interval lines parallel to the X-axis in the positive and negative directions of the Y-axis respectively. The distance between the first one of the fourth interval lines and the fourth line is $X_1$, the distance between the $m^{th}$ fourth interval line and the $(m-1)^{th}$ fourth interval line in the positive and negative directions of the Y-axis is $X_1+A_1(m-1)$. Here, $X_1$ is the Y-axis print interval, $A_1$ is the Y-axis interval step, m is the line number of the $m^{th}$ fourth interval line printed by the right extruder, the line number of the fourth line is 0, the line numbers increasing in the positive and negative directions of the Y-axis, and m=2, 3, . . . , M.

Step 1037. Determining whether there are lines coinciding between the lines printed by the left extruder and the right extruder. If not, (1037a) adjusting the Y-axis interval step and controlling the right extruder to again sequentially print M fourth interval lines parallel to the X-axis in the positive and negative directions of the Y-axis respectively, and returning to step 1037; if so, (1037b) proceeding to step 1038.

Step 1038. Calculating the offset between the left extruder and the right extruder in the Y-axis direction according to the line number of the lines that coincide. The offset between the left extruder and the right extruder in the Y-axis direction being the second offset.

Step 1038 may further include the following steps.

Step 10381. Determining whether the Y-axis coordinate of the lines that coincide is greater than 0. The Y-axis coordinate of the lines that coincide being greater than 0 indicates that the lines that coincide is in the positive half of the Y-axis, and the Y-axis coordinate of the lines that coincide being less than 0 indicates that the lines that coincide is in the negative half of the Y-axis. Step 10382. If so, calculating the second offset according to the equation $C=A_1M'$. Step 10383. If not, calculating the second offset according to the equation $C=-A_1M'$. Here, C is the second offset, M' is the line number of the lines that completely coincide.

In alternate embodiments, extruder calibration methods and systems for a dual-extruder 3D printer may further include vertical calibration of the left extruder and the right extruder prior to or after the horizontal calibration of the left extruder and the right extruder.

In some embodiments, the vertical calibration of the left extruder and the right extruder may include the following steps.

Step 201. Calculating the height difference between the left extruder and the bottom of a probe to obtain a first height difference.

Step 202. Adjusting the height of the left extruder according to the first height difference.

Step 203. Calculating the height difference between the right extruder and the bottom of the probe to obtain a second height difference.

Step 204. Adjusting the height of the right extruder according to the second height difference.

Optionally, Step 201 may further include the following steps.

Step 2011. Determining an initial height of the left extruder from the bottom of the probe when the probe is triggered. Specifically, the initial height of the left extruder from the bottom of the probe when the probe is triggered may be measured using a feeler gauge. The initial height of the left extruder from the bottom of the probe when the probe is triggered may be determined using a 0.3 mm feeler gauge, which may be implemented more quickly. Prior to step 2011, the method may include moving the left extruder directly above the heat bed.

Step 2012. Adjusting the height of the left extruder up or down on the basis of the initial height of the left extruder from the bottom of the probe to obtain a printing height of a first line for the left extruder and print the first line of the left extruder.

Step 2013. Determining whether the first line of the left extruder is a fully wavy line. If so, decreasing the printing height of the first line of the left extruder and reprinting the first line of the left extruder, and returning to step 2013; if not, proceeding to step 2014.

Step 2014. Adjusting the height of the left extruder according to a predetermined step for t times and printing the lines of the corresponding heights.

Step 2015. Determining whether there is a fully wavy line among the lines of the corresponding heights. If not, increasing the printing height of the first line of the left extruder and reprinting the first line of the left extruder, and returning to step 2014; if so, obtaining the height corresponding to the first fully wavy line of the left extruder, and calculating the height difference between the left extruder and the bottom of the probe. The height difference between the left extruder and the bottom of the probe may be the first height difference.

The height difference between the left extruder and the bottom of the probe may be calculated according to the following equation.

$$Offset_1 = Offset0_1 - Zstart_1 - (Zstep \times Index_1) + Z0 + Z1_1$$

Here, $Offset_1$ is the first height difference, $Offset0_1$ is the initial height of the left extruder from the bottom of the probe, $Zstart_1$ is the printing height of the first line of the left extruder, $Zstep$ is the predetermined step, $Index_1$ is the line number of the first fully wavy line of the left extruder minus 1, $Z0$ is the height from the printing platform for printing the best line, and $Z1_1$ is the height difference between the first fully wavy line of the left extruder and the height for printing the best line.

Step 203 may include the following steps.

Step 2031. Determining an initial height of the right extruder from the bottom of the probe when the probe is triggered. Alternately, the initial height of the right extruder from the bottom of the probe when the probe is triggered may also be measured using a feeler gauge. Prior to step 2031, the method may include restoring the left extruder and moving the right extruder directly above the heat bed.

Step 2032. Adjusting the height of the right extruder up or down on the basis of the initial height of the right extruder from the bottom of the probe to obtain a printing height of a first line for the right extruder and print the first line of the right extruder.

Step 2033. Determining whether the first line of the right extruder is a fully wavy line. If so, decreasing the printing height of the first line of the right extruder and reprinting the first line of the right extruder, and returning to step 2033; if not, proceeding to step 2034.

Step 2034. Adjusting the height of the right extruder according to a predetermined step for s times and printing the lines of the corresponding heights.

Step 2035. Determining whether there is a fully wavy line among the lines of the corresponding heights. If not, increasing the printing height of the first line of the right extruder and reprinting the first line of the right extruder, and returning to step 2034; if so, obtaining the height corresponding to the first fully wavy line of the right extruder, and calculating the height difference between the right extruder and the bottom of the probe. The height difference between the right extruder and the bottom of the probe may be the second height difference.

The height difference between the right extruder and the bottom of the probe may be calculated according to the following equation.

$$Offset_2 = Offset0_2 - Zstart_2 - (Zstep \times Index_2) + Z0 + Z1_2$$

Here, $Offset_2$ is the second height difference, $Offset0_2$ is the initial height of the right extruder from the bottom of the probe, $Zstart_2$ is the printing height of the first line of the right extruder, $Zstep$ is the predetermined step, $Index_2$ is the line number of the first fully wavy line of the right extruder minus 1, $Z0$ is the height from the printing platform for printing the best line, and $Z1_2$ is the height difference between the first fully wavy line of the right extruder and the height for printing the best line.

Figure 2:
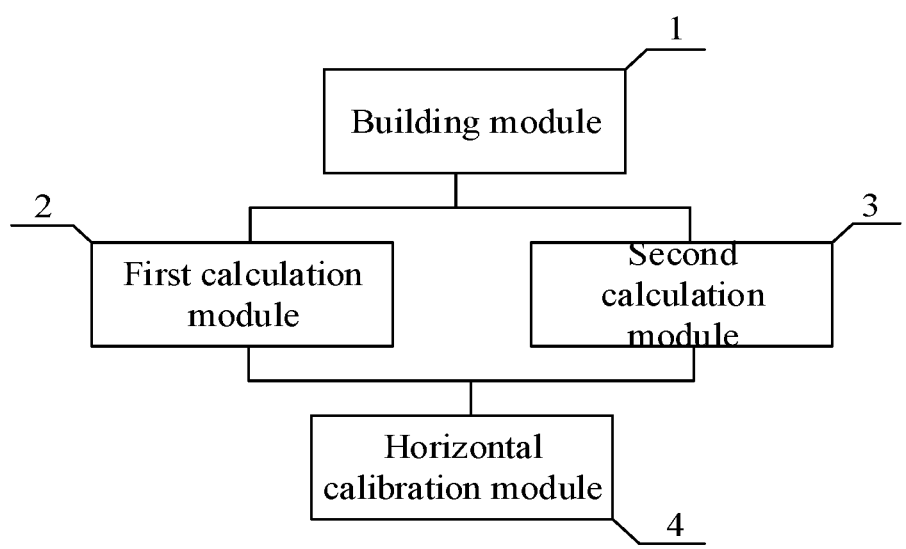
FIG. 2 is a schematic diagram of a horizontal calibration unit of an extruder calibration system for a dual-extruder 3D printer according to an embodiment of the disclosure.
Figure 3:
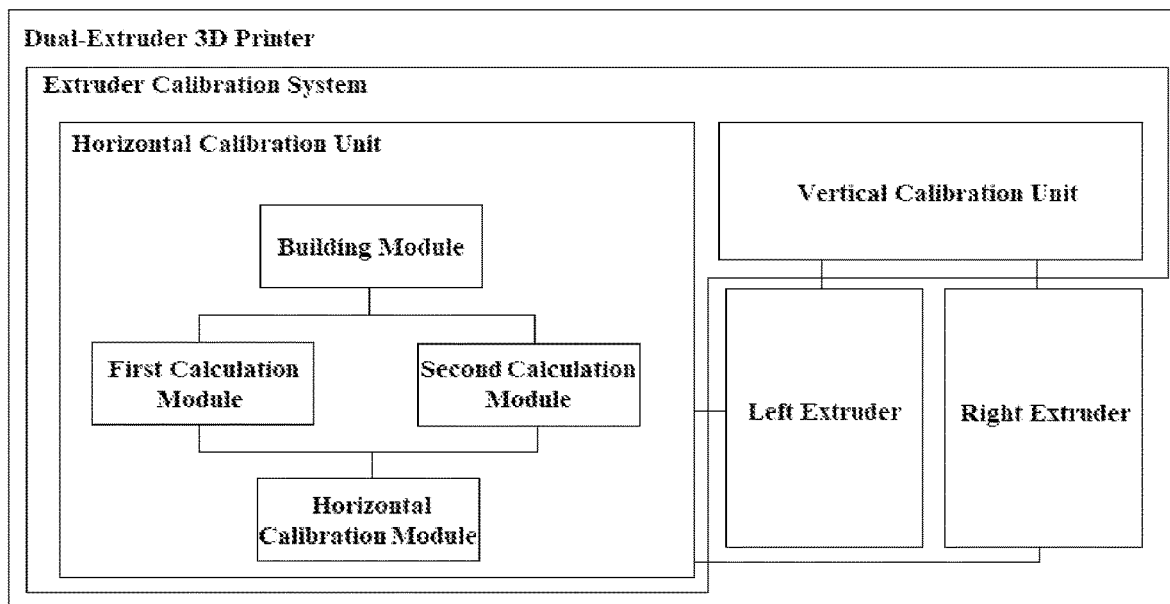
FIG. 3 is a schematic diagram of a dual-extruder 3D printer according to an embodiment of the disclosure.

FIG. 2 is a schematic diagram of a horizontal calibration unit of an extruder calibration system for a dual-extruder 3D printer according to an embodiment of the disclosure. As shown in FIG. 2, the horizontal calibration unit may include a building module 1, a first calculation module 2, a second calculation module 3, and a horizontal calibration module 4.

The building module 1 may be configured to build up a rectangular coordinate system on a heat bed of a 3D printer. The first calculation module 2 may be connected to the building module 1, the left extruder, and the right extruder respectively. The first calculation module 2 may be configured to calculate the offset between the left extruder and the right extruder in the X-axis direction to obtain a first offset. The second calculation module 3 may be connected to the building module 1, the left extruder, and the right extruder respectively. The second calculating module 3 may be configured to calculate the offset between the left extruder and the right extruder in the Y-axis direction to obtain a second offset. The horizontal calibration module 4 may be connected to the first calculation module 2, the second calculation module 3, the left extruder, and the right extruder respectively. The horizontal calibration module 4 may be configured to calibrate the left extruder and the right extruder according to the first offset and the second offset.

Optionally, the extruder calibration system for a dual-extruder 3D printer according to the present disclosure may further include a vertical calibration unit. The vertical calibration unit may be connected to the left extruder and the right extruder respectively, and the vertical calibration unit may be configured to calibrate the left extruder and the right extruder vertically.

In some embodiments, the disclosure may provide an extruder calibration method for a dual-extruder 3D printer. The extruders may include a left extruder and a right extruder. The extruder calibration method may include horizontal calibration of the left extruder and the right extruder. The horizontal calibration of the left extruder and the right extruder may include the following steps.

Building up a rectangular coordinate system on a heat bed of a 3D printer.

Calculating the offset between the left extruder and the right extruder in the X-axis direction to obtain a first offset.

Calculating the offset between the left extruder and the right extruder in the Y-axis direction to obtain a second offset.

Calibrating the left extruder and the right extruder according to the first offset and the second offset.

Optionally, the calculating the offset between the left extruder and the right extruder in the X-axis direction to obtain a first offset may further include the following steps.

Adjusting the positions of the left extruder and the right extruder so that the left extruder and the right extruder are both on the Y-axis.

Setting an X-axis print interval and an X-axis interval step.

Controlling the left extruder to print a first line parallel to the Y-axis on the Y-axis.

Controlling the right extruder to print a second line parallel to the Y-axis on the Y-axis.

Controlling the left extruder to sequentially print N first equally spaced interval lines parallel to the Y-axis in the positive and negative directions of the X-axis respectively, where N≥1 and the distance between the first one of the first interval lines and the first line may be the X-axis print interval.

Controlling the right extruder to sequentially print N second interval lines parallel to the Y-axis in the positive and negative directions of the X-axis respectively, where the distance between the first one of the second interval lines and the second line is $X_0$, the distance between the $n^{th}$ second interval line and the $(n-1)^{th}$ second interval line in the positive and negative directions of the X-axis is $X_0+A(n-1)$, $X_0$ is the X-axis print interval, A is the X-axis interval step, and n is the line number of the $n^{th}$ second interval line printed by the right extruder, with the line number of the second line being 0, and the line numbers increasing in the positive and negative directions of the X-axis, n=2, 3, ..., N.

Determining whether there are lines coinciding between the lines printed by the left extruder and the right extruder, if not, adjusting the X-axis interval step and controlling the right extruder to again sequentially print N second interval lines parallel to the Y-axis in the positive and negative directions of the X-axis respectively, and returning to the step of determining whether there are lines coinciding between the lines printed by the left extruder and the right extruder; if so, proceeding to the step below.

Calculating the offset between the left extruder and the right extruder in the X-axis direction according to the line number of the lines that coincide, the offset between the left extruder and the right extruder in the X-axis direction being the first offset.

Optionally, the calculating the offset between the left extruder and the right extruder in the X-axis direction according to the line number of the lines that coincide may include determining whether the X-axis coordinate of the lines that coincide is greater than 0. If so, calculating the first offset according to the equation B=AN'; if not, calculating the first offset according to the equation B=−AN'. Here, B is the first offset, N' is the line number of the lines that completely coincide.

Optionally, the calculating the offset between the left extruder and the right extruder in the Y-axis direction to obtain a second offset may include the following steps.

Adjusting the positions of the left extruder and the right extruder so that the left extruder and the right extruder are both on the X-axis.

Setting a Y-axis print interval and a Y-axis interval step.

Controlling the left extruder to print a third line parallel to the X-axis on the X-axis.

Controlling the right extruder to print a fourth line parallel to the X-axis on the X-axis.

Controlling the left extruder to sequentially print M third equally spaced interval lines parallel to the X-axis in the positive and negative directions of the Y-axis respectively, where M≥1, and the distance between the first one of the third interval lines and the third line may be the Y-axis print interval.

Controlling the right extruder to sequentially print M fourth interval lines parallel to the X-axis in the positive and negative directions of the Y-axis respectively, where the distance between the first one of the fourth interval lines and the fourth line is $X_1$, the distance between the $m^{th}$ fourth interval line and the $(m-1)^{th}$ fourth interval line in the positive and negative directions of the Y-axis is $X_1+A_1(m-1)$, $X_1$ is the Y-axis print interval, $A_1$ is the Y-axis interval step, and m is the line number of the $m^{th}$ fourth interval line printed by the right extruder, with the line number of the fourth line being 0, and the line numbers increasing in the positive and negative directions of the Y-axis, m=2, 3, ..., M.

Determining whether there are lines coinciding between the lines printed by the left extruder and the right extruder, if not, adjusting the Y-axis interval step and controlling the right extruder to again sequentially print M fourth interval lines parallel to the X-axis in the positive and negative directions of the Y-axis respectively, and returning to the step of determining whether there are lines coinciding between the lines printed by the left extruder and the right extruder; if so, proceeding to the step below.

Calculating the offset between the left extruder and the right extruder in the Y-axis direction according to the line number of the lines that coincide, the offset between the left extruder and the right extruder in the Y-axis direction being the second offset.

Optionally, the calculating the offset between the left extruder and the right extruder in the Y-axis direction according to the line number of the lines that coincide may include determining whether the Y-axis coordinate of the lines that coincide is greater than 0. If so, calculating the second offset according to the equation $C=A_1M'$; if not, calculating the second offset according to the equation $C=-A_1M'$. Here, C is the second offset, M' is the line number of the lines that completely coincide.

Optionally, the extruder calibration method further may include vertical calibration of the left extruder and the right extruder. The vertical calibration of the left extruder and the right extruder may include the following steps.

Calculating the height difference between the left extruder and the bottom of a probe to obtain a first height difference.

Adjusting the height of the left extruder according to the first height difference.

Calculating the height difference between the right extruder and the bottom of the probe to obtain a second height difference.

Optionally, the calculating the height difference between the left extruder and the bottom of a probe to obtain a first height difference may include the following steps.

Determining an initial height of the left extruder from the bottom of the probe when the probe is triggered.

Adjusting the height of the left extruder up or down on the basis of the initial height of the left extruder from the bottom of the probe to obtain a printing height of a first line for the left extruder, and printing the first line of the left extruder;

Determining whether the first line of the left extruder is a fully wavy line. If so, decreasing the printing height of the first line of the left extruder and reprinting the first line of the left extruder, and returning to the step of determining whether the first line of the left extruder is a fully wavy line; if not, proceeding to the step below.

Adjusting the height of the left extruder according to a predetermined step for t times and printing the lines of the corresponding heights.

Determining whether there is a fully wavy line among the lines of the corresponding heights. If not, increasing the printing height of the first line of the left extruder and reprinting the first line of the left extruder, and returning to the step of adjusting the height of the left extruder according to a predetermined step for t times, and printing the lines of the corresponding heights; if so, obtaining the height corresponding to the first fully wavy line of the left extruder, and calculating the height difference between the left extruder and the bottom of the probe, the height difference between the left extruder and the bottom of the probe being the first height difference.

Optionally, the calculating the height difference between the left extruder and the bottom of the probe may include calculating the height difference between the left extruder and the bottom of the probe according to the following equation.

$$Offset_1 = Offset0_1 - Zstart_1 - (Zstep \times Index_1) + Z0 + Z1_1$$

Here, $Offset_1$ is the first height difference, $Offset0_1$ is the initial height of the left extruder from the bottom of the probe, $Zstart_1$ is the printing height of the first line of the left extruder, $Zstep$ is the predetermined step, $Index_1$ is the line number of the first fully wavy line of the left extruder minus 1, $Z0$ is the height from the printing platform for printing the best line, and $Z1_1$ is the height difference between the first fully wavy line of the left extruder and the height for printing the best line.

In other embodiments, the disclosure provides an extruder calibration system for a dual-extruder 3D printer is provided. The extruders may include a left extruder and a right extruder. The extruder calibration system may include a horizontal calibration unit.

The horizontal calibration unit may include a building module configured to build up a rectangular coordinate system on a heat bed of a 3D printer; a first calculation module connected to the building module, the left extruder, and the right extruder respectively, and configured to calculate the offset between the left extruder and the right extruder in the X-axis direction to obtain a first offset; a second calculation module connected to the building module, the left extruder, and the right extruder respectively, and configured to calculate the offset between the left extruder and the right extruder in the Y-axis direction to obtain a second offset; and a horizontal calibration module connected to the first calculation module, the second calculation module, the left extruder, and the right extruder respectively, and configured to calibrate the left extruder and the right extruder according to the first offset and the second offset.

Optionally, the extruder calibration system may further include a vertical calibration unit. The vertical calibration unit may be connected to the left extruder and the right extruder respectively. The vertical calibration unit may be configured to calibrate the left extruder and the right extruder vertically.

Various embodiments of the disclosure may have one or more of the following effects. In some embodiments, the disclosure may provide extruder calibration methods and systems for a dual-extruder 3D printer, which may help to calibrate the positions of the extruders, eliminate the needs of manual adjustment, and/or simplify the operation. In other embodiments, different line groups in the extruder calibration systems and methods for a dual-extruder 3D printer may be printed using the left extruder and the right extruder respectively, and lines that completely coincide may be selected from the two-line groups to determine the offset, which may avoid the error caused by manually measuring the offset and improve calibration performance. In further embodiments, the extruder calibration systems and methods for a dual-extruder 3D printer may provide similar, same, or better beneficial effects compared with the prior art.

In some embodiments, calibration may be improved by performing both vertical calibration and horizontal calibration on the extruders. In other embodiments, in the horizontal calibration process, different line groups may be printed using the left extruder and the right extruder respectively, and lines that completely coincide may be selected from the two-line groups to determine the offset, which may avoid the error caused by manually measuring the offset and improves calibration performance. In further embodiments, a fully wavy line in the vertical calibration process may be used as the reference, instead of a semi-distorted line, which may be caused by an uneven platform, or the best line. The use of the first fully wavy line may save the user from selecting the unquantifiable best line and avoids the subjective factor.

Many different arrangements of the various components depicted, as well as components not shown, are possible without departing from the spirit and scope of the present disclosure. Embodiments of the present disclosure have been described with the intent to be illustrative rather than restrictive. Alternative embodiments will become apparent to those skilled in the art that do not depart from its scope. A skilled artisan may develop alternative means of implementing the aforementioned improvements without departing from the scope of the present disclosure.

It will be understood that certain features and subcombinations are of utility and may be employed without reference to other features and subcombinations and are contemplated within the scope of the claims. Unless indicated otherwise, not all steps listed in the various figures need be carried out in the specific order described.

The disclosure claimed is:

1. An extruder calibration method for a dual-extruder 3D printer having a left extruder and a right extruder, comprising the steps of:
   (1) building up a rectangular coordinate system on a heat bed of a 3D printer;
   (2) obtaining a first offset by calculating an offset between the left extruder and the right extruder in an X-axis direction according to a first line number of a first group of coinciding lines parallel to a Y-axis;
   (3) obtaining a second offset by calculating another offset between the left extruder and the right extruder in a Y-axis direction according to a second line number of a second group of coinciding lines parallel to an X-axis; and
   (4) calibrating the left extruder and the right extruder according to the first offset and the second offset.

2. The extruder calibration method of claim 1, wherein step (2) further comprises the steps of:
   (2.1) adjusting positions of the left extruder and the right extruder so that the left extruder and the right extruder are both on the Y-axis;
   (2.2) setting an X-axis print interval and an X-axis interval step;
   (2.3) controlling the left extruder to print a first parallel line parallel to Y-axis on the Y-axis;
   (2.4) controlling the right extruder to print a second parallel line parallel to the Y-axis on the Y-axis;
   (2.5) controlling the left extruder to sequentially print N equally spaced first interval lines parallel to the Y-axis and from the Y-axis in positive and negative directions of the X-axis respectively, where $N \geq 1$ and a distance between a first one of the N first interval lines and the first parallel line is the X-axis print interval;
   (2.6) controlling the right extruder to sequentially print N second interval lines parallel to the Y-axis in the positive and negative directions of the X-axis respectively, where a distance between a first one of the N second interval lines and the second parallel line is $X_0$, a distance between an $n^{th}$ second interval line and an $(n-1)^{th}$ second interval line in the positive and negative directions of the X-axis is $X_0+A(n-1)$, where $X_0$ is the X-axis print interval, A is the X-axis interval step, n is a line number of the $n^{th}$ second interval line printed by the right extruder, the line number of the second parallel line is 0, line numbers increase in the positive and negative directions of the X-axis, and n=2, 3, . . . , N;

(2.7) determining whether there are lines coinciding between the lines printed by the left extruder and the right extruder, (2.7a) if not, adjusting the X-axis interval step, controlling the right extruder to again sequentially print N second interval lines parallel to the Y-axis in the positive and negative directions of the X-axis respectively, and returning to step (2.7), and (2.7b) if so, proceeding to step (2.8); and (2.8) calculating the offset between the left extruder and the right extruder in the X-axis direction according to a line number of the lines that coincide, the line number being the first line number, the offset between the left extruder and the right extruder in the X-axis direction being the first offset and the lines that coincide being the first group of coinciding lines.

3. The extruder calibration method of claim 2, wherein step (2.8) further comprises determining whether the X-axis coordinate of the lines that coincide is greater than 0, (2.8a) if so, calculating the first offset according to $B=AN'$, and (2.8b) if not, calculating the first offset according to $B=-AN'$, where B is the first offset and N' is the line number of the lines that completely coincide.

4. The extruder calibration method of claim 1, wherein step (3) further comprises the steps of:

(3.1) adjusting positions of the left extruder and the right extruder so that the left extruder and the right extruder are both on the X-axis;

(3.2) setting a Y-axis print interval and a Y-axis interval step;

(3.3) controlling the left extruder to print a third parallel line parallel to the X-axis on the X-axis;

(3.4) controlling the right extruder to print a fourth parallel line parallel to the X-axis on the X-axis;

(3.5) controlling the left extruder to sequentially print M equally spaced third interval lines parallel to the X-axis and from the X-axis in positive and negative directions of the Y-axis respectively, where M≥1 and a distance between a first one of the M third interval lines and the third parallel line is the Y-axis print interval;

(3.6) controlling the right extruder to sequentially print M fourth interval lines parallel to the X-axis in the positive and negative directions of the Y-axis respectively, where a distance between a first one of the M fourth interval lines and the fourth parallel line is $X_1$, a distance between an $m^{th}$ fourth interval line and an $(m-1)^{th}$ fourth interval line in the positive and negative directions of the Y-axis is $X_1+A_1(m-1)$, where $X_1$ is the Y-axis print interval, $A_1$ is the Y-axis interval step, m is a line number of the $m^{th}$ fourth interval line printed by the right extruder, the line number of the fourth parallel line is 0, line numbers increase in the positive and negative directions of the Y-axis, and m=2, 3, . . . , M;

(3.7) determining whether there are lines coinciding between the lines printed by the left extruder and the right extruder, (3.7a) if not, adjusting the Y-axis interval step, controlling the right extruder to again sequentially print M fourth interval lines parallel to the X-axis in the positive and negative directions of the Y-axis respectively, and returning to step (3.7), and (3.7b) if so, proceeding to step (3.8); and (3.8) calculating the offset between the left extruder and the right extruder in the Y-axis direction according to a line number of the lines that coincide, the line number being the second line number, the offset between the left extruder and the right extruder in the Y-axis direction being the second offset, and the lines that coincide being the second group of coinciding lines.

5. The extruder calibration method of claim 4, wherein step (3.8) further comprises determining whether the Y-axis coordinate of the lines that coincide is greater than 0, (3.8a) if so, calculating the second offset according to $C=A_1M'$, and (3.8b) if not, calculating the second offset according to $C=-A_1M'$, where C is the second offset, M' is the line number of the lines that completely coincide.

6. The extruder calibration method of claim 1, further comprising a step (5) of a vertical calibration of the left extruder and the right extruder, comprising the steps of:

(5.1) obtaining a first height difference by calculating a height difference between the left extruder and a bottom of a probe;

(5.2) adjusting a height of the left extruder according to the first height difference;

(5.3) obtaining a second height difference by calculating a height difference between the right extruder and the bottom of the probe; and (5.4) adjusting a height of the right extruder according to the second height difference.

7. The extruder calibration method of claim 6, wherein step (5.1) further comprises the steps of:

(5.1.1) determining an initial height of the left extruder from the bottom of the probe when the probe is triggered;

(5.1.2) obtaining a printing height of a first line for the left extruder and printing the first line of the left extruder by adjusting the height of the left extruder vertically based on the initial height of the left extruder from the bottom of the probe;

(5.1.3) determining whether the first line of the left extruder is a fully wavy line, (5.1.3a) if so, decreasing the printing height of the first line of the left extruder, reprinting the first line of the left extruder, and returning to step (5.1.3), and (5.1.3b) if not, proceeding to step (5.1.4);

(5.1.4) adjusting the height of the left extruder according to a predetermined step for t times and printing lines of corresponding heights; and (5.1.5) determining whether there is fully wavy line among the lines of the corresponding heights, (5.1.5a) if not, increasing the printing height of the first line of the left extruder and reprinting the first line of the left extruder, and returning to step (5.1.5), and (5.1.5b) if so, obtaining the height corresponding to a first fully wavy line of the left extruder, and calculating the height difference between the left extruder and the bottom of the probe, the height difference between the left extruder and the bottom of the probe being the first height difference.

8. The extruder calibration method of claim 7, wherein the calculating the height difference between the left extruder and the bottom of the probe is according to $$Offset_1 = Offset0_1 - Zstart_1 - (Zstep \times Index_1) + Z0 + Z1_1,$$

where $Offset_1$ is the first height difference, $Offset0_1$ is the initial height of the left extruder from the bottom of the probe, $Zstart_1$ is the printing height of the first line of the left extruder, $Zstep$ is the predetermined step, $Index_1$ is a line number of the first fully wavy line of the left extruder minus 1, $Z0$ is the height from a printing platform for printing the best line, and $Z1_1$ is the height difference between the first fully wavy line of the left extruder and the height for printing the best line.

9. An extruder calibration system for a dual-extruder 3D printer comprising a horizontal calibration unit, wherein:
the dual-extruder comprises a left extruder and a right extruder; and
the horizontal calibration unit comprises:
a building module configured to build up a rectangular coordinate system on a heat bed of a 3D printer;
a first calculation module connected to the building module, the left extruder, and the right extruder respectively, and configured to obtain a first offset by calculating an offset between the left extruder and the right extruder in an X-axis direction according to a first line number of a first group of coinciding lines parallel to a Y-axis;
a second calculation module connected to the building module, the left extruder, and the right extruder respectively, and configured to obtain a second offset by calculating anther offset between the left extruder and the right extruder in a Y-axis direction according to a second line number of a second group of coinciding lines parallel to an X-axis; and
a horizontal calibration module connected to the first calculation module, the second calculation module, the left extruder, and the right extruder respectively, and configured to calibrate the left extruder and the right extruder according to the first offset and the second offset.

10. The extruder calibration system of claim 9, further comprising a vertical calibration unit, wherein:
the vertical calibration unit is connected to the left extruder and the right extruder respectively; and
the vertical calibration unit is configured to calibrate the left extruder and the right extruder vertically.

* * * * *